United States Patent [19]

Essers

[11] 4,220,844
[45] Sep. 2, 1980

[54] METHOD OF AND DEVICE FOR PLASMA MIG WELDING

[75] Inventor: Wilhelmus G. Essers, Emmasingel, Netherlands

[73] Assignee: U.S. Philips Corporation, New York, N.Y.

[21] Appl. No.: 845,108

[22] Filed: Oct. 25, 1977

Related U.S. Application Data

[63] Continuation of Ser. No. 467,385, May 6, 1974, abandoned.

[30] Foreign Application Priority Data

May 23, 1973 [NL] Netherlands .......................... 7307170

[51] Int. Cl.² ............................................. B23K 9/16
[52] U.S. Cl. ............................ 219/121 P; 219/76.16; 219/75; 219/137 R
[58] Field of Search ................. 219/121 P, 137 R, 75, 219/74, 76.16; 313/231.3

[56] References Cited

U.S. PATENT DOCUMENTS

| | | | |
|---|---|---|---|
| 2,862,099 | 11/1958 | Gage | 219/121 P |
| 3,612,807 | 10/1971 | Liefkens et al. | 219/121 P |
| 3,770,935 | 11/1973 | Tutero et al. | 219/121 P |
| 3,830,997 | 8/1974 | Esses et al. | 219/121 P |
| 3,969,603 | 7/1976 | Boughton | 219/121 P |

OTHER PUBLICATIONS

Welding Processes and Power Source–by Pierre Scientif Library–chapter 17–pp. 281-285, Power Publications.
Plasma MIG Welding–by Essers et al., Philips Tech. Rev. 33, 21-24, 1973, #1.

*Primary Examiner*—B. A. Reynolds
*Assistant Examiner*—Mark Paschall
*Attorney, Agent, or Firm*—Thomas A. Briody; William J. Streeter; Rolf E. Schneider

[57] ABSTRACT

A plasma-MIG welding system includes establishing a plasma arc between a primary non-consumable electrode and an auxiliary non-consumable nozzle electrode to provide a plasma flow downstream of the primary non-consumable electrode and out through such nozzle electrode. A consumable electrode is fed through the plasma flow out through the nozzle electrode, a MIG-arc being established between the consumable electrode and a workpiece. A gas stream consisting of an inert gas and an oxidizing gas is flowed past the consumable electrode in a manner to completely envelope the same and into admixture with the plasma flow without coming into contact with the non-consumable electrode. A separate gas stream provides a sheath for the resulting plasma flow after its passage through the nozzle electrode.

2 Claims, 1 Drawing Figure

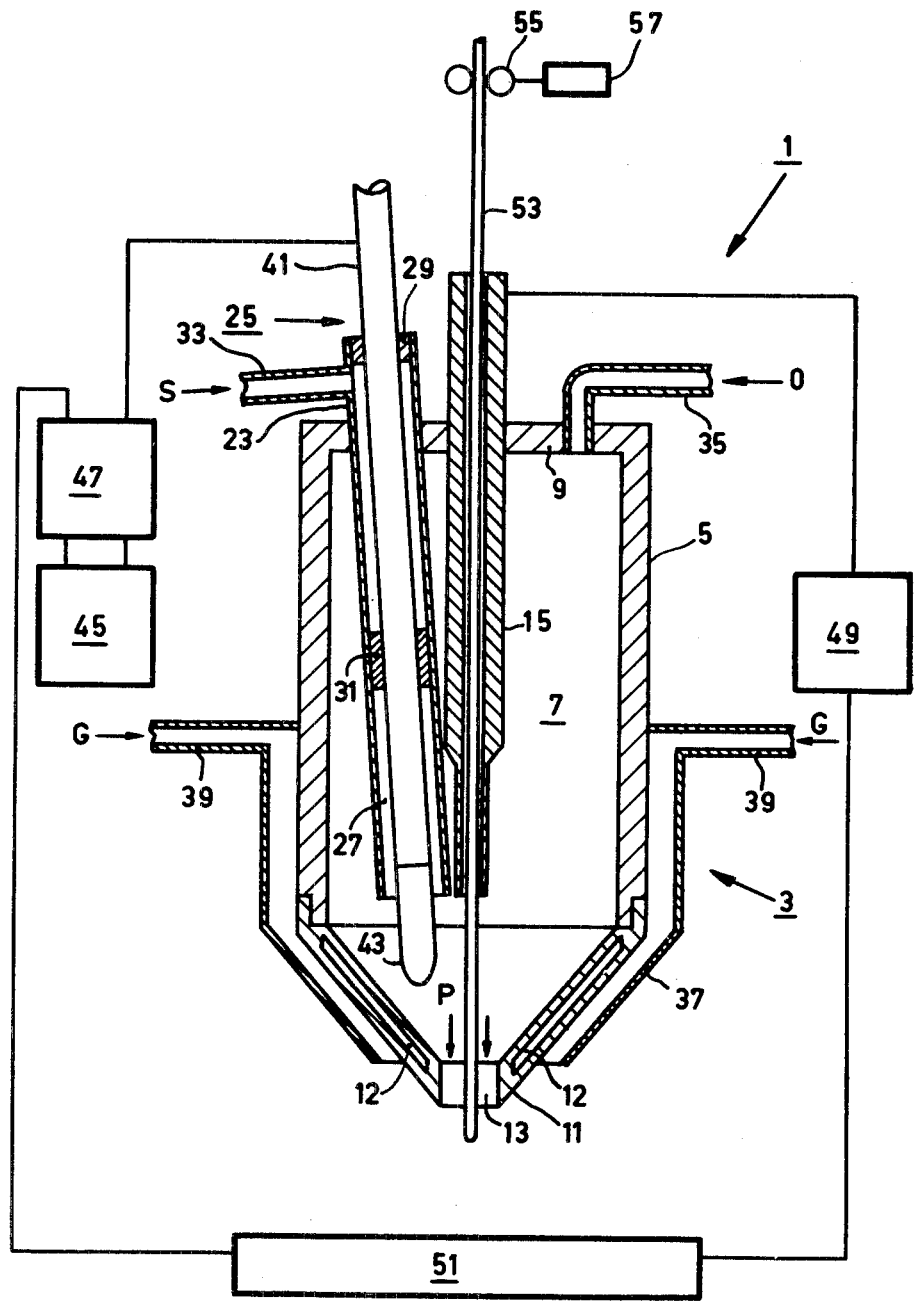

METHOD OF AND DEVICE FOR PLASMA MIG WELDING

This is a continuation of application Ser. No. 467,385 filed on May 6, 1974 now abandoned.

This invention relates to a method of plasma inert-gas metal-arc (MIG) welding in which a plasma arc is maintained in a plasma gas stream between a non-consumable electrode and an auxiliary electrode, a consumable electrode is fed into the plasma produced by the plasma arc, and an arc is maintained between the consumable electrode and a workpiece.

Such a method is described in U.S. Pat. No. 3,612,807. In this known method an inert gas, preferably argon, is used as the plasma gas. If an oxidizing gas were used, the non-consumable electrode would rapidly be destroyed.

It is an object of the present invention to provide a method in which an oxidizing gas mixture can be used as the plasma gas without the non-consumable electrode being damaged.

According to the invention this is achieved by forming a plasma gas stream comprising a mixture of an oxidizing gas and an inert gas, the mixture being obtained by combining a primary inert gas stream which envelopes the consumable electrode and contains the oxidizing gas with a secondary inert gas stream which envelopes the nonconsumable electrode.

The method according to the invention enables any desired mixture of an inert gas an oxidizing gas to be used, the non-consumable electrode being protected by a separate sheath of an inert gas. Thus the field of application of the welding method is considerably extended. The method according to the invention may be used both in plasma-MIG welding with a transferred plasma arc, in which process the plasma arc is maintained between the non-consumable electrode and a workpiece which acts as the auxiliary electrode, and in plasma-MIG welding with a non-transferred plasma arc which is maintained between the non-consumable electrode and an auxiliary electrode other than the workpiece, for example an auxiliary electrode wich forms a part of a welding torch.

It should be stated that it has already been proposed in the method described in such U.S. Pat. No. 3,612,807 to introduce an oxidizing gas stream into the plasma stream produced by the plasma arc; however, according to this proposal the oxidizing gas stream is supplied downstream of the non-consumable electrode and directed on to the consumable electrode so as to prevent oxidation of the non-consumable electrode and to bring about oxidation of the consumable electrode. In contradistinction thereto, in the method according to the invention the entire exposed part of the consumable electrode is surrounded by the oxidizing primary gas stream.

In a preferred embodiment of the method according to the invention the gas mixture contains at most 20 percent by volume of oxidizing gas. By using a gas mixture which contains a comparatively high proportion of oxidizing gas the consumption of the expensive inert gas, in most cases argon, may be restricted. The use of an increasing amount of oxidizing gas enables the voltage of the plasma arc and thus the rate of deposition of the consumable electrode to be increased.

In another preferred embodiment of the method according to the invention in which both the consumable and the non-consumable electrodes have positive polarity the gas mixture contains carbon dioxide as the oxidizing gas in a proportion of at least 2 percent by volume. The use of a gas mixture which contains at least 2 percent by volume of carbon dioxide as the oxidizing gas invariably results in a weld having a regular and satisfactory appearance.

Not only carbon dioxide but also other oxidizing gases, for example oxygen, may be used as the oxidizing gas. In a further preferred embodiment of the method according to the invention in which both the consumable and the non-consumable electrodes have positive polarity the gas mixture contains oxygen as the oxidizing gas in a proportion of at most 5 percent by volume. Experiments have shown that when oxygen is used as the oxidizing gas damage to and combustion of the nozzle are prevented by limiting the proportion of oxygen to at most 5 percent by volume.

In another preferred embodiment of the method according to the invention in which both the consumable and the non-consumable electrodes have a negative polarity the gas mixture contains carbon dioxide as the oxidizing gas in a proportion of at least 1 percent by volume. With negative polarity of the two electrodes and in the absence of an oxidizing gas the arc between the consumable electrode and the workpiece is unstable, because the cathode spot on the consumable electrode tends to travel on the electrode. In the method according to the invention this arc is stablized, because the free part of the consumable electrode is oxidized by the primary, oxidizing gas stream which completely envelopes this electrode, so that the cathode spot occupies a defined position on the negative, consumable electrode.

In still another preferred embodiment of the method according to the invention in which both the consumable and the non-consumable electrodes have negative polarity the gas mixture contains oxygen as the oxidizing gas in a proportion of at most 5 percent by volume.

In this embodiment also an excessive proportion of oxygen would cause damage to and combustion of the nozzle. It was found that with a proportion of oxygen of 0.1 percent by volume a stable arc is obtained between the consumable electrode and the workpiece.

The invention further relates to a device for carrying out the method according to the invention which comprises a welding torch having a chamber, means for passing a gas stream through the chamber, a nozzle having an orifice at the downstream end of the chamber, a non-consumable electrode in the chamber, means for guiding a consumable electrode in the direction of flow of the gas steam through the nozzle orifice, and two electric supply sources for maintaining a plasma arc between the non-consumable electrode and an auxiliary electrode and an arc between the consumable electrode and a workpiece; according to the invention the said device is characterized by a sleeve which surrounds the non-consumable electrode with a certain amount of clearance and forms an annular channel for supplying a gas steam which envelopes the non-consumable electrode. The device according to the invention permits of supplying an oxidizing gas stream which envelopes the consumable electrode whilst the non-consumable electrode is protected by an inert-gas steam which is supplied through the sleeve.

It should be noted that U.S. Pat. No.2,862,099 describes a method of protecting the tungsten electrode of a plasma torch against oxidation by an inert gas stream enveloping this electrode whilst, in particular for cutting metal workpieces, an oxidizing gas is supplied as the plasma gas; however, in this method no consumable electrode is fed into the arc, so that the problem referred to, that is oxidizing the consumable electrode and stabilizing the arc between the consumable electrode and the workpiece, does not arise.

An embodiment of the invention will now be described, by way of example, with reference to the accompanying diagrammatic drawing which is a part sectional part schematic view of a device for carrying out the method according to the invention.

A device 1 includes a welding torch 3 which comprises a casing 5 surrounding a chamber 7 which at its upper end is closed by a hood 9. A copper nozzle 11 having cooling passage 12 and a flow opening 13 is secured to the lower end of the casing 5. A guide and contact tube 15 and a sleeve 23 which surrounds a non-consumable electrode 25 are secured in the hood 9. The sleeve 23 surrounds the electrode 25 with a certain amount of clearance and together with it forms an annular channel 27. The channel is closed at its upper end by a sealing insulating spacing ring 29. The electrode 25 is supported in the sleeve 23 by an insulating spacing ring 31 in the form of a gas distributor made, for example, of a as-permeable porous material or in the shape of a solid ring formed with axial bores. The annular channel 27 communicates with a gas inlet 33. Another gas inlet 35 is provided in the hood 9. The casing 5 is partly enclosed by a screen 37 having gas inlets 39. The electrode 25 comprises a watercooled copper holder 41 and an end part 43 made for example of tungsten. The device 1 further includes a first electric supply source 45 connected to a high-frequency generator 47 and a second electric supply source 49. A workpiece is denoted by 51.

In order to carry out the method according to the invention a primary gas stream 0 which contains oxidizing constituents is supplied through the gas inlet 35; a preferred oxidizing gas steam is a mixture of argon and carbon dixoide or a mixture of argon and oxygen. The gas stream 0 passes in an axial direction through the chamber 7 to flow out of the opening 13 of the nozzle 11. Via the inlet 33 a secondary, inert gas stream S is supplied which flows through the annular channel 27 towards the opening 13 and forms a sheath which envelopes the electrode 25. The spacing ring 31 which acts as a gas distributor produces laminar flow of the gas stream S. A filler wire 53 is fed through the bore of the contact tube 15 and moved. in the direction of flow of the gas stream 0 through the opening 13 towards the workpiece 51. The filler wire 53 is fed by means of drive rollers 55 driven by a motor 57. A plasma arc is maintained between the non-consumable electrode 25 and the workpiece 51, the non-consumable electrode 25 being connected via the high-frequency generator 47 to one terminal of the supply source 45 the other terminal of which is connected to the workpiece 51. A MIG-arc is maintained between the workpiece 51 and the filler wire 53 by means of the supply source 49 one terminal of which is connected to the workpiece 51 whilst the other termnal is connected via the contact tube 15 to the filler wire 53. Through the inlets 39 in the screen 37 a shielding gas G, for example a mixture of argon and carbon dioxide, can be supplied.

The primary oxidizing gas stream 0 which flows towards the opening 13 surrounds the free end part of the filler wire 53 so that the wire is evenly oxidized. The non-consumable electrode is protected against oxidation by the secondary, inert gas stream S which envelopes it. Downstream of the sleeve 23 but upstream of the opening 13 the primary gas stream 0 and the secondary gas stream S are combined to form a plasma gas steam P.

The plasma gas steam P contains the oxidizing constituents of the primary gas stream 0 in the aforementioned amounts depending upon the polarity of the electrode 25 and of the filler wire 53 and upon the oxidizing gas itself.

In welding tests carried out with the following gas compositions and arc voltages welds having an even and satisfactory appearance were obtained with a stable MIG-arc without damage to the welding torch and without combustion of the workpiece:

| electrode polarity | positive | | negative | |
|---|---|---|---|---|
| oxidizing gas | $CO_2$ | $CO_2$ | $CO_2$ | $O_2$ |
| Diameter filler wire | 1,2 mm | 1,2 mm | 1,2 mm | 1,2 mm |
| Primary gas stream (oxidizing gas) | A + $CO_2$ | A + $CO_2$ | A + $CO_2$ | A + $CO_2$ |
| Primary gas in liters/minute | 6 | 7 | 5 | 5 |
| Inert gas | A | A | A | A |
| Inert gas in liters/minute | 5 | 5 | 5 | 5 |
| Amount of oxidizing gas | 9% | 17% | 2% | 0.4% |
| Welding current in amps (filler wire) | 136 | 115 | 225 | 220 |
| Welding voltage in volts (filler wire) | 41 | 42 | 40 | 40 |
| Welding current in amps. (tungsten electrode) | 104 | 100 | 110 | 115 |
| Welding current in volts (tungsten electrode) | 64 | 70 | 50 | 47 |

The invention has been discribed with reference to an embodiment in which a transferred plasma arc was used which was maintained between the non-consumable electrode and a workpiece which acted as an auxiliary electrode. The invention may be used to equal advantage in welding with the use of a non-transferred plasma arc which is maintained between the non-consumable electrode and an auxiliary electrode other than the workpiece, for example an auxiliary electrode which forms part of the welding torch.

What is claimed is:

1. A method of plasma-MIG welding, which comprises flowing a first gas stream consisting of a first thermally ionizable inert gas past a primary non-consumable electrode toward an auxiliary non-consumable nozzle electrode, said first gas stream completely enveloping said primary non-consumable electrode; establishing a plasma arc between said primary non-consumable electrode and said auxiliary non-consumable nozzle electrode to initiate and sustain a plasma flow downstream of said primary non-consumable electrode and out through said auxiliary non-consumable nozzle electrode; feeding a consumable electrode from an enclosed source through said plasma flow and out through said auxiliary non-consumable nozzle electrode toward a workpiece, said feeding resulting in an exposed portion of said consumable electrode; establishing a MIG-arc between said consumable electrode and said workpiece; flowing a second gas stream consisting of a mixture of a second thermally ionizable inert gas and an oxidizing gas past said consumable electrode in a manner to completely envelope the exposed portion of and oxidize the same and into admixture with said plasma flow, the resulting plasma flow thereby containing the oxidizing gas, the first gas stream protecting said primary non-consumable electrode against oxidation by the oxidizing gas; and flowing a third gas stream consisting of a protective gas past the resulting plasma flow after its passage through the auxiliary non-consumable nozzle electrode toward the workpiece to provide a sheath surrounding said resulting plasma flow.

2. A plasma-MIG welding apparatus, which comprises a welding torch provided with a primary non-consumable electrode, first means for flowing a first gas stream consisting of a first thermally ionizable inert gas past said primary non-consumable electrode toward an auxiliary non-consumable nozzle electrode in a manner so as to completely envelope the primary non-consumable electrode; a first circuit means including a first power supply means, said primary non-consumable electrode, and said auxiliary non-consumable nozzle electrode for establishing a plasma arc between said primary non-consumable electrode and said auxiliary non-consumable nozzle electrode to initiate and sustain a plasma flow downstream of said primary non-consumable electrode and out through said auxiliary non-consumable nozzle electrode; means for feeding a consumable electrode from an enclosed source through said plasma flow and out through said auxiliary non-consumable nozzle electrode toward a workpiece to provide an exposed portion of said consumable electrode; a second circuit means including said consumable electrode, a second power supply, and said workpiece for establishing a MIG-arc between said consumable electrode and said workpiece; second means for flowing a second gas stream consisting of a mixture of a second thermally ionizable inert gas and an oxidizing gas past said consumable electrode in a manner to completely envelope the exposed portion of and oxidize the same and into admixture with said plasma flow to thereby incorporate the oxidizing gas in said plasma flow, said first means serving to protect said primary non-consumable electrode against oxidation by the oxidizing gas; and third means for flowing a third gas stream consisting of a protective gas past the oxidizing gas-containing plasma flow after its passage through the auxiliary non-consumable nozzle electrode toward the workpiece to provide a sheath surrounding such plasma flow.

* * * * *